United States Patent
Diehl et al.

(10) Patent No.: US 7,360,460 B2
(45) Date of Patent: Apr. 22, 2008

(54) SENSOR DEVICE FOR A VEHICLE SEAT

(75) Inventors: Andreas Diehl, Otterbach (DE); Hans Edrich, Heltersberg (DE); Daniel Hippel, Winnweiler (DE); Michael Borbe, Rheinbach (DE); Rolf Schüler, Heiligenhaus (DE); Frank Grossbudde, Wuppertal (DE)

(73) Assignee: KEIPER GmbH & Co. KG, Kaiserslautern (DE)

( * ) Notice: Subject to any disclaimer, the term of this patent is extended or adjusted under 35 U.S.C. 154(b) by 381 days.

(21) Appl. No.: 11/111,665

(22) Filed: Apr. 21, 2005

(65) Prior Publication Data

US 2005/0229721 A1    Oct. 20, 2005

Related U.S. Application Data

(63) Continuation of application No. PCT/EP03/13758, filed on Dec. 5, 2003.

(30) Foreign Application Priority Data

Jan. 31, 2003    (DE) ................ 103 03 826

(51) Int. Cl.
*G01L 1/26*    (2006.01)
*G01L 5/04*    (2006.01)
(52) U.S. Cl. ................................. 73/862.391
(58) Field of Classification Search ........... 73/862.381, 73/862.391
See application file for complete search history.

(56) References Cited

U.S. PATENT DOCUMENTS

| | | | |
|---|---|---|---|
| 5,942,695 A | 8/1999 | Verma et al. | |
| 6,161,891 A | 12/2000 | Blakesley | |
| 6,231,076 B1 | 5/2001 | Blakesley et al. | |
| 6,323,443 B1 | 11/2001 | Aoki et al. | |
| 6,478,378 B2 * | 11/2002 | Muhlberger et al. ... | 297/344.12 |
| 6,571,647 B1 | 6/2003 | Aoki et al. | |
| 6,729,193 B2 * | 5/2004 | Ishida ................... | 73/862.627 |
| 6,835,899 B2 * | 12/2004 | Wolfe et al. ............... | 177/144 |
| 6,865,961 B2 * | 3/2005 | Wolf et al. ............. | 73/862.69 |
| 6,916,997 B2 * | 7/2005 | Thakur et al. ............. | 177/136 |
| 6,931,947 B2 * | 8/2005 | Schulze et al. ........ | 73/862.381 |
| 6,981,717 B2 * | 1/2006 | Sakamoto et al. .......... | 280/735 |
| 6,988,413 B1 * | 1/2006 | Lichtinger et al. ............ | 73/768 |
| 7,017,699 B2 * | 3/2006 | Becker et al. .............. | 180/273 |

FOREIGN PATENT DOCUMENTS

| | | |
|---|---|---|
| DE | 199 25 877 A1 | 1/2000 |
| DE | 100 11 371 A1 | 9/2000 |
| DE | 101 21 668 A1 | 11/2002 |
| DE | 101 45 370 A1 | 12/2002 |
| JP | 10264700 | 10/1998 |
| WO | WO 99/35012 | 7/1999 |

* cited by examiner

*Primary Examiner*—Michael Cygan
*Assistant Examiner*—Octavia Davis
(74) *Attorney, Agent, or Firm*—Womble Carlyle Sandridge & Rice, PLLC

(57) ABSTRACT

In a vehicle seat, in particular a motor vehicle seat, a sensor device (11) is arranged between the superstructure of the vehicle seat and the seat rail (3) of the vehicle seat, in order to measure forces transmitted from the superstructure into the seat rail (3). The sensor device (11) can be positioned at least partially inside the seat rail (3).

27 Claims, 1 Drawing Sheet

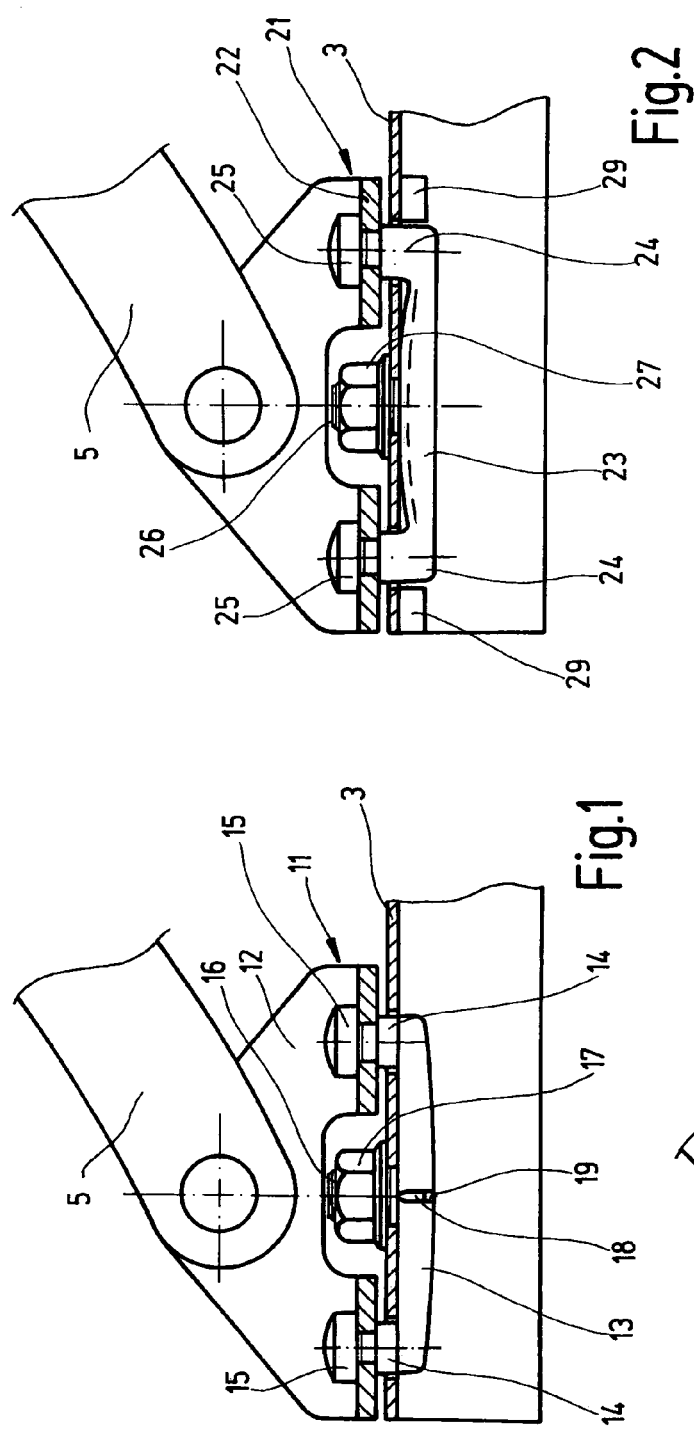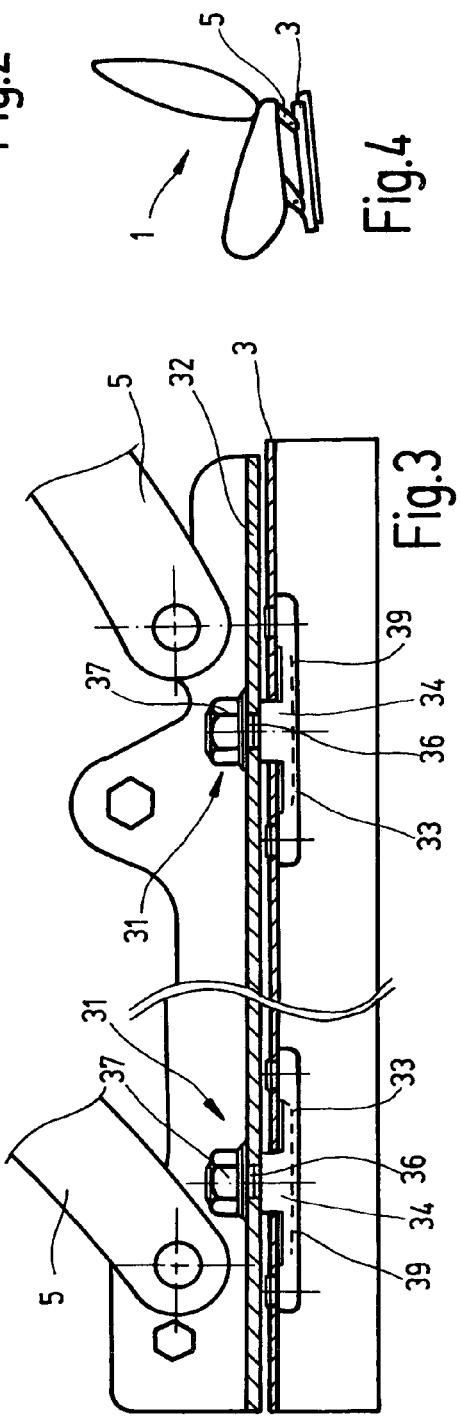

SENSOR DEVICE FOR A VEHICLE SEAT

CROSS-REFERENCE TO RELATED APPLICATIONS

The present application is a continuation of International Application PCT/EP2003/013758, which was filed Dec. 5, 2003, designates the U.S., and claims the benefit of DE 103 03 826.4 of Jan. 31, 2003.

INCORPORATION BY REFERENCE

International Application PCT/EP2003/013758, which was filed Dec. 5, 2003, and DE 103 03 826.4, which was filed Jan. 31, 2003, are each incorporated herein by reference in their entirety.

BACKGROUND OF THE INVENTION

The present invention relates to a sensor device for a vehicle seat, in particular for a motor vehicle seat, with the sensor device being arranged between a superstructure of the vehicle seat and the seat rail of the vehicle seat, for measuring forces transmitted from the superstructure to the seat rail.

A sensor device of the kind described immediately above is known from WO 99/35012 A1, and the sensor device is arranged between the rail system and an intermediate frame, which in turn supports the superstructure. Between the two assembly blocks, of which the one is attached to the rail system and the other to the intermediate frame, the sensor device displays a cantilevered arm with single sensors, which detect changes in pressure or in tensile tension in the arm.

BRIEF SUMMARY OF SOME ASPECTS OF THE INVENTION

An aspect of the present invention is the provision of improvements to a sensor device of the general type mentioned above. According to an aspect of the present invention, a sensor device for a vehicle seat, in particular for a motor vehicle seat, is mounted so that the sensor device is at least partially positioned inside the vehicle seat's seat rail and is for being at least partially between the seat rail and the vehicle seat's superstructure, for measuring forces transmitted from the superstructure to the seat rail. The seat rail in combination with the sensor device can be characterized as substructure that is for at least partially carrying the superstructure.

The fact that the sensor device is at least partially, and more specifically predominantly, positioned inside the seat rail has advantages. For example, it has a space-saving effect, especially with respect to height. In addition, the geometric relations above the seat rail are more or less maintained, so that the same components can be used in the construction of the seat structure, regardless of whether the sensor device is installed or not. Such a sensor device, the essential functional component of which (e.g., the core component of which) is positioned inside the seat rail, can therefore also be easily integrated into an existing modular seat structure. Furthermore, the seat rail protects the sensor device from damage, which can be advantageous because some components of the sensor device can be quite sensitive.

According to the invention, only sensor device parts or components of minor significance, such as mounting elements, etc., are positioned outside the seat rail. Normally, since the superstructure is supported at four points, two sensor devices per seat rail are provided.

In a preferred version, a core component of the sensor device is a flexible arm, the shape of which allows it to be arranged in a space-saving way within the assembly space defined by (e.g., substantially enclosed by) the seat rail. The arm is suspended from the seat rail either at the end or centrally. The connection with the superstructure is preferably achieved by means of a protrusion, which protrudes either centrally (in the case of suspension at the end) or at the end (in the case of central suspension) through a preferably existing opening (i.e. an opening also provided in the standard version without the sensor device) in the seat rail, particularly upwards, and to which an adaptor of the vehicle seat superstructure is preferably attached. The adaptor can be used to fulcrum one or two rocker arms, with one or a total of two sensor devices being attached to the adaptor respectively. The adaptor is arranged at a distance from the seat rail, in order to ensure a certain measuring distance. As an overload protection, the arrangement is preferably such that the adaptor comes to rest on the seat rail in the case of high forces, i.e. secondary reinforcement is provided.

In a preferred version, the forces are measured in accordance with the flex arm principle, i.e. the flexing of the arm is detected either as a deviation in the geometry, or as a movement occasioned by a change in the geometry. Examples of sensors (e.g., sensor elements) to be used for this purpose include Hall sensors, strain gauges and other inductive or capacitive sensors, or sensors based on crystalline properties. The flex arm principle can also be modified, in the case of minimal measuring distances, by measuring the pressure in the arm. The preferred instrument (e.g., sensor element) for this task is a piezoelectric sensor, which requires only a measuring distance in the atomic order of magnitude (practically zero distance) and detects even minute pressure changes in the arm. For instance, the piezoelectric sensor can be positioned in a gap in the arm, which endows the arm with a hinge function. However, it is also possible to use a hinge only, instead of the arm endowed with a hinge function.

However, the sensor device can also have a twistable element which can be positioned inside the seat rail instead of the arm, and whose torsion is then detected by one of the aforementioned sensors.

According to the invention, the sensor device can be used, for example, to register seat occupancy, measure the weight of the occupant, or determine the distribution of weight over several measuring points, and this can be done in virtually any vehicle seat. For instance, the sensor signal can be used to guide and control the activation of airbags, both according to extent and duration, also in the case of an installed child's safety seat, or to determine presettings for the various adjusting devices, lateral cheeks, lumbar supports, etc. In these cases, the seat can be height-adjustable or of a fixed height.

Other aspects and advantages of the present invention will become apparent from the following.

BRIEF DESCRIPTION OF THE DRAWINGS

The invention is explained in greater detail below by way of three exemplary embodiments illustrated in the drawings, in which:

FIG. 1 is a partially sectional lateral view of the first embodiment,

FIG. 2 is a partially sectional lateral view of the second embodiment,

FIG. 3 is a partially sectional lateral view of the third embodiment, and

FIG. 4 is a schematized representation of a vehicle seat.

DETAILED DESCRIPTION OF THE INVENTION

All three embodiments have a both longitudinally adjustable and height adjustable vehicle seat 1 for a motor vehicle. For the purposes of longitudinal adjustment, the vehicle seat 1 is provided on each side with a pair of seat rails 3, which are adjustable relative to one another, and of which the lower rail is attached to the vehicle structure, whereas the remaining vehicle seat structure, which can be referred to as the superstructure, is mounted on the upper rail. The height adjustment is effected by means of two pairs of rocker arms 5, which are arranged at the four corners of the vehicle seat 1. The lower ends of the rocker arms 5 are linked to the upper seat rail 3, and the upper ends of the rocker arms 5 are linked to a seat frame, which is not illustrated in detail in the accompanying figures. Seat occupancy, the occupant's weight and, if applicable, the precise distribution of weight over several measuring points are to be registered, for instance in order to control the activation of airbags.

According to the first embodiment a sensor device 11 is arranged between an adaptor 12 on one side and a seat rail 3 on the other side. The adaptor 12 links a single rocker arm 5 to the seat rail 3. Accordingly, the sensor device 11 is lying in the force flux from the rocker arm 5 to the seat rail 3.

The sensor device 11 comprises an arm 13. The arm 13 is arranged lengthwise within the assembly space defined by the seat rail 3. The arm 13 protrudes upward with two projections 14 which are formed onto either end of the arm. The projections 14 respectively protrude through preferably existing openings in the seat rail 3. The adaptor 12 is screwed onto each of the two projections 14 at either end of the arm by means of screws 15, or fastened to them in some other way. The bottom side of the adaptor 12 is at a distance from (e.g., spaced apart from) the upper side of the seat rail 3.

Attached to the middle of the arm 13 and on its upper side is a threaded bolt 16. The bolt 16 protrudes upward through a further opening in the seat rail 3, where it is screwed to the seat rail 3 by means of a nut 17. As a result, the arm 13 is suspended from the seat rail 3. The adaptor 12 has a corresponding recess into which the nut 17 fits, without coming into contact with the adaptor 12. The arm 13 can also be centrally attached in some other way to the seat rail 3.

Also in its middle section, the arm 13 has a slot 18 that is open towards the bottom side of the arm 13. The slot 18 forms a hinge. At the opening end of the slot 18, a piezoelectric sensor 19 is positioned between the two halves of the arm 13. The piezoelectric sensor 19 is contour fitted into the slot 18. When a force is transmitted from the superstructure, via the rocker arm 5 and the adaptor 12, to the sensor device 11, this force is transmitted via the arm 13, and the pressure on the piezoelectric sensor 19 changes. In this way, the piezoelectric sensor 19 can measure the transmitted force by sensing the pressure. Although the arm 13 bends, with the result that excessive forces cause the adaptor 12 to come to rest on the upper side of the seat rail 3, the width of the slot 18 changes at the atomic level only. The sensor device 11 in the first exemplary embodiment thus operates in accordance with a modified flex arm principle with a defined hinge function.

The second exemplary embodiment has a sensor device 21 which is largely similar to that of the first exemplary embodiment, but works on a genuine flex arm principle. As before, the sensor device 21 is arranged between an adaptor 22 on one side and the seat rail 3 on the other side. The adaptor 22 links a single rocker arm 5 to the seat rail 3. Accordingly, the sensor device 21 is lying in the force flux from the rocker arm 5 to the seat rail 3.

The sensor device 21 also comprises an arm 23. The arm 23 is arranged lengthwise within the assembly space defined by the seat rail 3. The arm 23 protrudes upward with two projections 24 which are formed onto either end of the arm. The projections 24 respectively protrude through preferably existing openings in the seat rail 3. The adaptor 22 is screwed to each of the two projections 24, one at either end of the arm, by means of screws 25, or attached in some other way. The bottom side of the adaptor 22 is at a distance from (e.g., spaced apart from) the upper side of the seat rail 3.

Attached to the middle of the arm 23 is a threaded bolt 26. The bolt 26 protrudes upward through a further opening in the seat rail 3, where it is screwed to the seat rail 3 by means of a nut 27. As a result, the arm 23 is suspended from the seat rail 3. The adaptor 22 has a corresponding recess into which the nut 27 fits, without coming into contact with the adaptor 22. The arm 23 can also be centrally attached in some other way to the seat rail 3.

A Hall sensor 29 is positioned in the seat rail 3 in each of the end areas of the arm 23. When a force is transmitted from the superstructure via the rocker arm 5 and the adaptor 22 to the sensor device 21, the centrally mounted arm 23 bends, causing its ends to move, with the movement then being detected by the Hall sensors 29. In the case of excessive forces, the adaptor 22 comes to rest on the upper side of the seat rail 3.

In a modified version, the Hall sensors 29 are replaced by a strain gauge, which is integrated into the centrally arranged arm 23, this strain gauge measuring strip detecting a bending of the arm 23 caused by a movement of the projections 24 at either end of the arm.

The third exemplary embodiment has a sensor device 31, which is similar to that in the first and second exemplary embodiments, i.e. particularly also working on the flex arm principle. The sensor device 31 is arranged in the area where the rocker arm 5 is linked, between the adaptor 32 on the one side and the seat rail 3 on the other, in the force flux from the rocker arms 5 to the seat rail 3. However, the adaptor 32 extends over a greater length and serves to link both rocker arms 5 on this side of the vehicle seat 1.

The sensor device 31 is equipped with an arm 33, which is arranged lengthwise within the assembly space defined by the seat rail 3. At both ends, the arm 33 is riveted to the seat rail 3 or attached in another way, so that it is suspended from the seat rail 3. A projection 34 is formed onto the central part of the arm 33, which protrudes upwards through a preferably existing opening in the seat rail 3 and bears an upwardly protruding threaded bolt 36. The adaptor 32, arranged at a distance from (e.g., spaced apart from) the upper side of the seat rail 3, rests on the projection 34 and is fastened by means of a nut 37 onto the threaded bolt 36 of the sensor device 31. The adaptor 32 can also be attached by some other means to the central part of the arm 33.

A strain gauge 39 is integrated into the arm 33. However, a Hall sensor may also be used. When a force is transmitted from the superstructure via the rocker arm 5 and the adaptor 32 into the sensor device 31, the central part of the arm 23, which is attached by its ends, begins to bend, namely centrally, which is in turn detected by the strain gauge 39. In the case of excessive forces, the adaptor 32 comes to rest on the upper side of seat rail 3.

It will be understood by those skilled in the art that while the present invention has been discussed above with reference to exemplary embodiments, various additions, modifications and changes can be made thereto without departing from the spirit and scope of the invention as set forth in the following claims.

What is claimed is:

1. A substructure apparatus for at least partially carrying a vehicle seat superstructure and measuring forces transmitted from the superstructure, the substructure apparatus comprising:

at least one seat rail that substantially encloses and defines an assembly space that is within at least one seat rail; and at least one sensor device mounted so that the sensor device is at least partially positioned in said assembly space and is for being at least partially between the seat rail and the superstructure, wherein the sensor device includes a core component adapted for being affected by the forces transmitted from the superstructure to the seat rail, the sensor device is for measuring the forces transmitted from the superstructure to the seat rail, with the sensor device being adapted so that the measuring of the forces comprises determining how the core component is affected by the forces transmitted from the superstructure to the seat rail, and the core component is positioned in said assembly space.

2. The substructure apparatus according to claim 1, wherein:

the core component is a flexible arm, the arm includes a central section and end sections, and the arm is suspended from the seat rail by way of at least one section selected from the group consisting of the central section of the arm and the end sections of the arm.

3. The substructure apparatus according to claim 2, wherein:

the arm includes at least one projection, the projection extends through an opening in the seat rail so that at least a portion of the projection extends out of said assembly space, and the projection extends from the central section of the arm or one of the end sections of the arm.

4. The substructure apparatus according to claim 3 in combination with at least a portion of the superstructure, wherein:

the portion of the superstructure is an adaptor, and the adaptor is attached to the projection.

5. The combination according to claim 4, wherein:

the sensor device is a first sensor device, the combination further comprises a second sensor device mounted so that the second sensor device is at least partially positioned in said assembly space, is attached to the adaptor, and is at least partially between the seat rail and the adaptor, for measuring the forces transmitted from the superstructure to the seat rail, and the second sensor device is spaced apart from the first sensor device.

6. The combination according to claim 4, wherein the sensor device is operative:

for keeping the adaptor spaced apart from the seat rail when the forces are less than a predetermined magnitude, and so that the adaptor engages the seat rail in response to the forces reaching or exceeding the predetermined magnitude.

7. The substructure apparatus according to claim 2, wherein:

the arm is operative for bending in response to the forces, and the sensor device is operative for measuring the forces by detecting the bending of the arm.

8. The substructure apparatus according to claim 7, wherein the sensor device includes at least one sensor element for detecting the bending of the arm, and the sensor element is a Hall sensor or a strain gauge.

9. The substructure apparatus according to claim 2, wherein the sensor device is operative for measuring the forces by detecting pressure conditions in the arm.

10. The substructure apparatus according to claim 9, wherein the sensor device includes at least one sensor element for detecting the pressure conditions in the arm, and the sensor element is a piezoelectric sensor.

11. The substructure apparatus according to claim 10, wherein the arm includes a slit that at least partially defines a hinge, and the piezoelectric sensor is positioned in the slit.

12. The substructure apparatus according to claim 1 in combination with the superstructure, wherein the sensor device is connected to the superstructure and is at least partially between the seat rail and the superstructure.

13. The combination according to claim 5, wherein the first and second sensor devices are operative:

for keeping the adaptor spaced apart from the seat rail when the forces are less than a predetermined magnitude, and so that the adaptor engages the seat rail in response to the forces reaching or exceeding the predetermined magnitude.

14. The substructure apparatus according to claim 3, wherein:

the arm is operative for bending in response to the forces, and the sensor device includes at least one sensor element for measuring the forces by detecting the bending of the arm.

15. The combination according to claim 4, wherein:

the arm is operative for bending in response to the forces, and the sensor device includes at least one sensor element for measuring the forces by detecting the bending of the arm.

16. The combination according to claim 6, wherein:

the arm is operative for bending in response to the forces, and the sensor device includes at least one sensor element for measuring the forces by detecting the bending of the arm.

17. The combination according to claim 3, wherein the sensor device includes at least one sensor element for measuring the forces by detecting pressure conditions in the arm.

18. The combination according to claim 4, wherein the sensor device includes at least one sensor element for measuring the forces by detecting pressure conditions in the arm.

19. The combination according to claim 6, wherein the sensor device includes at least one sensor element for measuring the forces by detecting pressure conditions in the arm.

20. The substructure apparatus according to claim 1, wherein:
the core component is a flexible arm that includes at least one projection, and
the projection extends from a section of the arm, through an opening in the seat rail, so that a portion of the projection is in said assembly space and another portion of the projection is outside of said assembly space.

21. The substructure apparatus according to claim 2, wherein:
the seat rail is elongate and thereby has a length that extends in a longitudinal direction,
the arm is elongate and thereby has a length, and
the length of the arm extends in the longitudinal direction.

22. The substructure apparatus according to claim 3, comprising a fastener attached to the projection, wherein the fastener is positioned outside of said assembly space.

23. The substructure apparatus according to claim 8, wherein the sensor element is positioned in said assembly space.

24. The substructure apparatus according to claim 10, wherein the sensor element is positioned in said assembly space.

25. A substructure apparatus for at least partially carrying a vehicle seat superstructure and measuring forces transmitted from the superstructure, the substructure apparatus comprising:
at least one seat rail that substantially encloses and defines an assembly space that is within at least one seat rail; and
at least one sensor device for measuring the forces transmitted from the superstructure to the seat rail, wherein
the sensor device is mounted to the seat rail so that the sensor device is substantially positioned in said assembly space and is for being at least partially between the seat rail and the superstructure,
the sensor device includes
(a) an arm for being affected by the forces transmitted from the superstructure to the seat rail, and
(b) at least one sensor element for determining how the arm is affected by the forces transmitted from the superstructure to the seat rail, whereby the sensor device is for measuring the forces transmitted from the superstructure to the seat rail, and
the arm is positioned in said assembly space.

26. The substructure apparatus according to claim 25, wherein the sensor element is positioned in said assembly space.

27. The substructure apparatus according to claim 26, wherein:
the arm includes at least one projection, and
at least a portion of the projection extends out of said assembly space.

* * * * *

UNITED STATES PATENT AND TRADEMARK OFFICE
CERTIFICATE OF CORRECTION

| | |
|---|---|
| PATENT NO. | : 7,360,460 B2 |
| APPLICATION NO. | : 11/111665 |
| DATED | : April 22, 2008 |
| INVENTOR(S) | : Andreas Diehl et al. |

Page 1 of 1

It is certified that error appears in the above-identified patent and that said Letters Patent is hereby corrected as shown below:

In the claims:

Col. 5, claim 1, line 6, insert "the" immediately after --within--.

Col. 7, claim 25, line 6, insert "the" immediately after --within--.

Signed and Sealed this

Twenty-ninth Day of July, 2008

JON W. DUDAS
*Director of the United States Patent and Trademark Office*